(12) United States Patent
Owen et al.

(10) Patent No.: US 11,363,024 B2
(45) Date of Patent: Jun. 14, 2022

(54) SUPPLANTING ACCESS CREDENTIALS FOR SHARED DATA VISUALIZATIONS

(71) Applicant: SIGMA COMPUTING, INC., San Francisco, CA (US)

(72) Inventors: Gregory G. Owen, San Bruno, CA (US); Donald Huang, San Francisco, CA (US); Stipo Josipovic, San Francisco, CA (US); Kenneth Truong, Temple City, CA (US); Nipurn Doshi, Redwood City, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

(21) Appl. No.: 17/015,579

(22) Filed: Sep. 9, 2020

(65) Prior Publication Data

US 2022/0078189 A1 Mar. 10, 2022

(51) Int. Cl.
*H04L 9/40* (2022.01)

(52) U.S. Cl.
CPC .................. *H04L 63/10* (2013.01)

(58) Field of Classification Search
CPC ... H04L 63/10; H04L 67/1097; G06F 16/248; G06F 16/168; G06F 16/904; G06F 16/972; G06F 21/6218; G06F 16/13; G06F 16/26; G06F 16/284; G06F 16/9038; G06T 11/206; G06T 2200/24; G06Q 10/06; G06Q 10/101
See application file for complete search history.

(56) References Cited

U.S. PATENT DOCUMENTS

| 9,176,966 | B2 * | 11/2015 | Silverstein | G06F 16/80 |
| 9,721,038 | B1 * | 8/2017 | Xiang | G06F 16/90 |
| 10,043,591 | B1 * | 8/2018 | LaBorde | A61B 5/165 |
| 10,635,093 | B2 * | 4/2020 | Miller | H04L 67/38 |
| 10,681,073 | B2 * | 6/2020 | Sofer | H04L 63/1466 |
| 10,942,900 | B2 * | 3/2021 | Rathinagiri | G06F 16/1827 |

(Continued)

OTHER PUBLICATIONS

Anonymous, "Understanding Service Accounts," Cloud Identity and Access Management Documentation, XP055633590, URL: https://web.archive.org/web/20180717204752/https://cloud.google.com/iam/docs/understanding-service-accounts [retrieved on Oct. 18, 2019]; Jul. 17, 2018, 8 pages.

(Continued)

*Primary Examiner* — David R Lazaro (57) ABSTRACT

Supplanting access credentials for shared data visualizations including receiving, from a first identity provider (IDP) account, a request to generate a data visualization utilizing restricted data from a cloud-based data warehouse, wherein the data visualization is generated by accessing the restricted data using the first IDP account; in response to receiving a request to share the data visualization with a receiving entity without access to the restricted data, associating, by a data visualizer, the data visualization with a service account with access to the restricted data, wherein the service account is not authenticated as a user of the first IDP account; and providing, by the data visualizer to the receiving entity, access to the data visualization including generating the data visualization by accessing, using the service account, the restricted data from the cloud-based data warehouse.

18 Claims, 6 Drawing Sheets

(56) References Cited

U.S. PATENT DOCUMENTS

| | | | | |
|---|---|---|---|---|
| 2013/0187926 | A1* | 7/2013 | Silverstein | G06F 16/285 |
| | | | | 345/440 |
| 2014/0129936 | A1* | 5/2014 | Richards | H04L 63/101 |
| | | | | 715/716 |
| 2014/0164008 | A1* | 6/2014 | Gordon | G16H 20/10 |
| | | | | 705/2 |
| 2016/0019281 | A1 | 1/2016 | Hariharan et al. | |
| 2017/0177201 | A1* | 6/2017 | Disdero | G06F 16/248 |
| 2018/0121566 | A1* | 5/2018 | Filippi | G06F 16/9038 |
| 2018/0181446 | A1* | 6/2018 | Bequet | G06F 16/90344 |
| 2019/0101884 | A1* | 4/2019 | Miller | G05B 19/41875 |
| 2019/0101900 | A1* | 4/2019 | Miller | G05B 19/4185 |
| 2019/0101909 | A1* | 4/2019 | Miller | H04L 9/3226 |
| 2019/0102456 | A1* | 4/2019 | Miller | G06F 16/168 |
| 2019/0146637 | A1* | 5/2019 | Plache | G06F 16/21 |
| | | | | 715/810 |
| 2019/0207964 | A1* | 7/2019 | Sofer | H04L 63/1425 |
| 2020/0301939 | A1* | 9/2020 | Hollander | G06F 16/2471 |
| 2021/0191629 | A1* | 6/2021 | Vibhor | G06F 3/0659 |

OTHER PUBLICATIONS

Carter, Peter A., "Implementing Service Accounts for Security," Securing SQL Server, Apress, Berkeley, CA, XP055872957, ISBN: 978-1-4842-2265-2,pp. 117-128, DOI: 10.1007/978-1-4842-2265-2_7, URL:http://link.springer.com/content/pdf/1, Jan. 1, 2016, pp. 117-128.

International Search Report and Written Opinion, PCT/US2021/049444, dated Jan. 4, 2022, 14 pages.

* cited by examiner

Data Visualization 300

Add a description...

Undo | Redo

Charts | Filters $fx$

| Column A 308A | Column B 308B | Column C 308C | Column D 308D | Column E 308E | Column F 308F |
|---|---|---|---|---|---|
| | | | | | |
| | | | | | |
| | | | | | |
| | | | | | |
| | | | | | |

*Spreadsheet Structure 302*

45 Rows – 6 Columns

List Structure 304

Last updated a few seconds ago

Columns | Data Sources

TOTALS

> LEVEL 2

Select Grouping Key

Drop Calculation Here

> LEVEL 1

Select Grouping Key

Drop Calculation Here

Base Columns

SUPPLANTING ACCESS CREDENTIALS FOR SHARED DATA VISUALIZATIONS

BACKGROUND

Field of the Invention

The field of the invention is data processing, or, more specifically, methods, apparatus, and products for supplanting access credentials for shared data visualizations.

Description Of Related Art

Modern businesses may store large amounts of data in remote databases within cloud-based data warehouses. This data may be accessed using database query languages, such as structured query language (SQL). However, constructing complex database query statements is difficult for most users. Further, frequent database requests may be computationally and financially expensive. Utilizing a second system to simplify some of these tasks requires a second set of credentials in addition to the credentials required to access the cloud-based data warehouse. An identity provider may eliminate some of these issues, but implementation of identity provider accounts is not without complications.

SUMMARY

Methods, systems, and apparatus for supplanting access credentials for shared data visualizations. Supplanting access credentials for shared data visualizations includes receiving, from a first identity provider (IDP) account, a request to generate a data visualization utilizing restricted data from a cloud-based data warehouse, wherein the data visualization is generated by accessing the restricted data using the first IDP account; in response to receiving a request to share the data visualization with a receiving entity without access to the restricted data, associating, by a data visualizer, the data visualization with a service account with access to the restricted data, wherein the service account is not authenticated as a user of the first IDP account; and providing, by the data visualizer to the receiving entity, access to the data visualization including generating the data visualization by accessing, using the service account, the restricted data from the cloud-based data warehouse.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
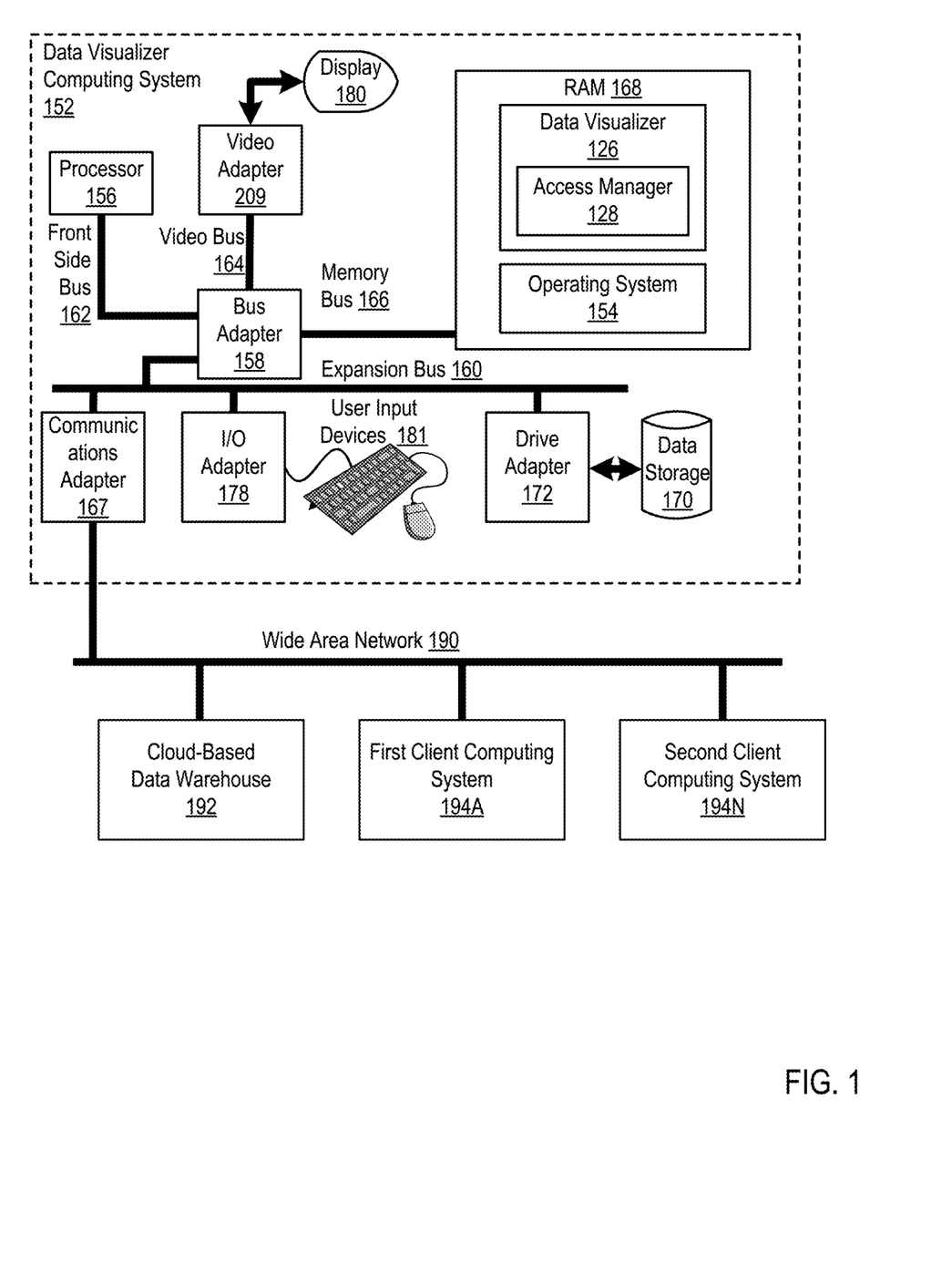
FIG. 1 sets forth a block diagram of an example system configured for supplanting access credentials for shared data visualizations according to embodiments of the present invention.

Exemplary methods, apparatus, and products for supplanting access credentials for shared data visualizations in accordance with the present invention are described with reference to the accompanying drawings, beginning with FIG. 1. FIG. 1 sets forth a block diagram of automated computing machinery comprising an exemplary data visualizer computing system (152) configured for supplanting access credentials for shared data visualizations according to embodiments of the present invention. The data visualizer computing system (152) of FIG. 1 includes at least one computer processor (156) or 'CPU' as well as random access memory (168) (RAM') which is connected through a high speed memory bus (166) and bus adapter (158) to processor (156) and to other components of the data visualizer computing system (152).

Stored in RAM (168) is an operating system (154). Operating systems useful in computers configured for supplanting access credentials for shared data visualizations according to embodiments of the present invention include UNIX™, Linux™, Microsoft Window™, AIX™, IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the data visualizer (126) and access manager (128), modules for supplanting access credentials for shared data visualizations according to embodiments of the present invention.

The data visualizer computing system (152) of FIG. 1 includes disk drive adapter (172) coupled through expansion bus (160) and bus adapter (158) to processor (156) and other components of the data visualizer computing system (152). Disk drive adapter (172) connects non-volatile data storage to the data visualizer computing system (152) in the form of data storage (170). Disk drive adapters useful in computers configured for supplanting access credentials for shared data visualizations according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example data visualizer computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example data visualizer computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary data visualizer computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for supplanting access credentials for shared data visualizations according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192), a first client computing system (194A), and a second client computing system (194B). The cloud-based data warehouse (192) is a computing system or group of computing systems that hosts a database for access over the wide area network (190). The client systems (first client computing system (194A), second client computing system (194B)) are computing systems that accesses the database using the data visualizer (126) on the data visualizer computing system (152).

Figure 2:
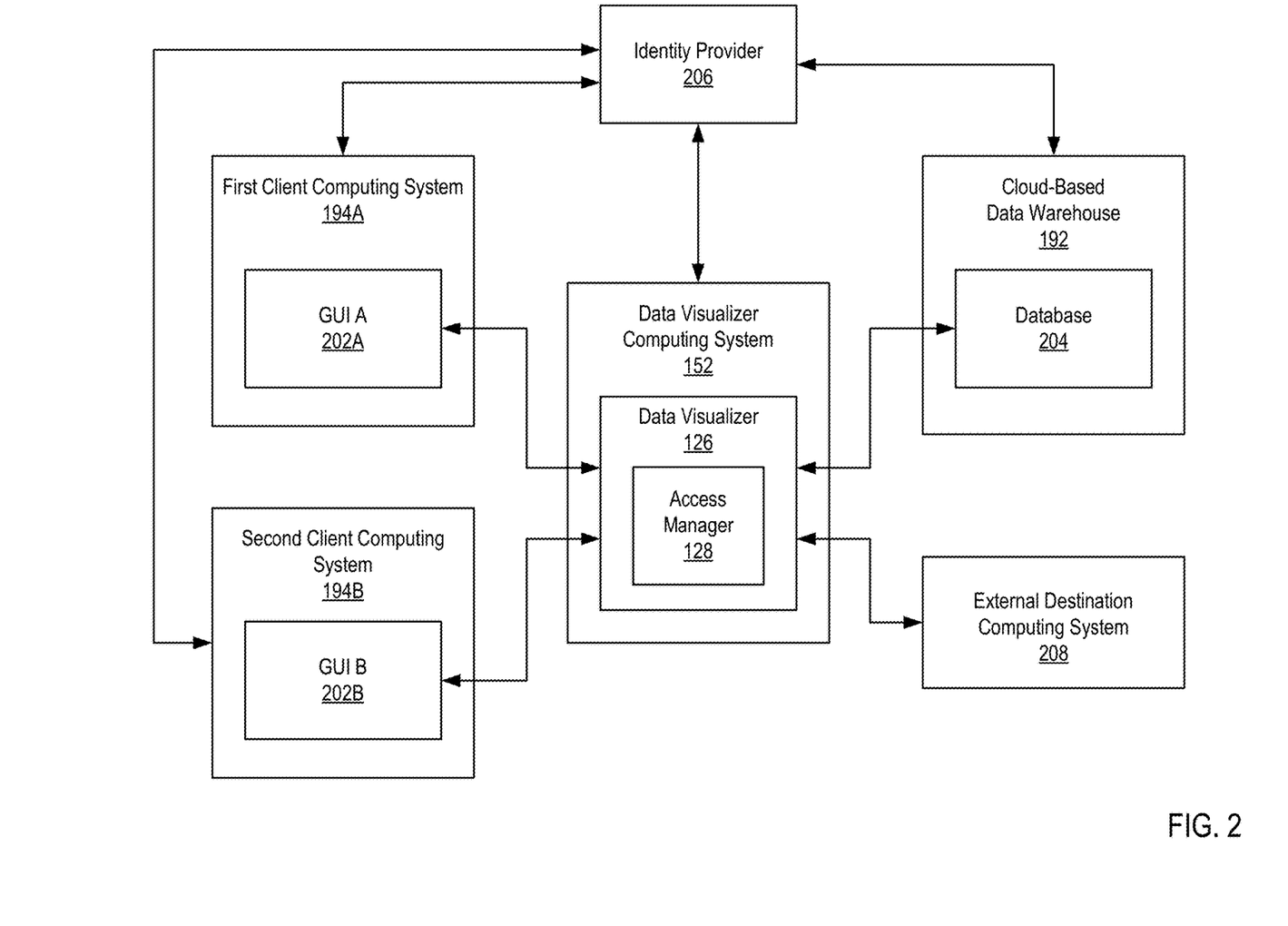
FIG. 2 sets forth a block diagram of an example system configured for supplanting access credentials for shared data visualizations according to embodiments of the present invention.

FIG. 2 shows an exemplary system for supplanting access credentials for shared data visualizations according to embodiments of the present invention. As shown in FIG. 2, the exemplary system includes an identity provider (IDP) (206), a data visualizer computing system (152), a first client computing system (194A), a second client computing system (194B), a cloud-based data warehouse (192), and an external destination computing system (208). The first client computing system (194A) includes a graphical user interface (GUI) A (202A). The second client computing system (194B) also includes a GUI B (202B). The cloud-based data warehouse (192) includes a database (204). The data visualizer computing system (152) includes a data visualizer (126). The data visualizer (126) includes an access manager (128).

The data visualizer (126) is an aggregation of hardware and software configured to provide data visualizations to users of the client computing systems (first client computing system (194A), second client computing system (194B)) and to other external destinations hosted on external destination computing systems (208). A data visualization is an abstraction of data from a database (204) on the cloud-based data warehouse (192). Specifically, a data visualization may include worksheets, graphs, or other visual elements representing data or changes in data from the database (204). A dashboard is a type of data visualization that includes a combination of visual elements. Data from the database (204) used to create a data visualization is referred to as underlying data.

The IDP (206) is a system that manages and authenticates user accounts across multiple systems, such as the data visualizer computing system (152) and the cloud-based data warehouse (192). Each system (data visualizer computing system (152), cloud-based data warehouse (192)) utilizing IDP accounts may associate each account with a set of permissions and, in some case, a role. The IDP (206) may operate, in part, by providing access tokens that can be used to access resources, such as data visualizations and data from the database (204), under the control of the IDP account user.

The access manager (128) within the data visualizer (126) interacts with the IDP (206) to verify and enforce authorizations and access restrictions to data visualizations and underlying data from the database (204). The access manager (128) may verify that a particular IDP account has access to both the data visualization as well as the underlying data from the database (204). This may include retrieving, on behalf of the IDP account user, the data from the database (204) using the IDP account user's credentials.

The access manager may also utilize a service account to provide data visualizations to IDP account users who do not have authorization to view the underlaying data but have nevertheless been granted access to the data visualization by an IDP account user with access to the underlying data. A service account is an account with the cloud-based data warehouse (192) (exclusively or through the IDP (206)) with broad access to the database (204). For example, a human resources officer for a company may generate a data visualization for fiscal analysis using a database table that includes each employee's salary. The data visualization may show only an aggregate amount spent on salaries for each division of the company. The human resources officer may share the data visualization with a vice president that does not have access to the database table that includes each employee's salary. Upon detecting this situation, the access manager (128) may associate the data visualization with the service account allowing the vice president to view the data visualization without granting the vice president access to the underlying data. When the data visualization is accessed by the vice president, the data visualizer (126) accesses the underlying data using the service account and generates the data visualization. Note that each time the data visualization is generated for the vice president, the data visualization will include live data from the database (204), even data that has changed since the data visualization was first shared with the vice president.

Each client computing system (first client computing system (194A), second client computing system (194B)) is a computing system used by an IDP account user to access data visualizations presented by the data visualizer (126). The GUIs (GUI A (202A), GUI B (202B)) display data visualizations to the IDP account user. The cloud-based data warehouse (192) hosts the database (204). The database (204) is a collection of data from tables and a management system for the data.

The external destination computing system (208) is a computing system not under the control of an IDP account but may be under the control of a user with an IDP account. The external destination computing system (208) may be, for example, an email server, a webhost, or a social media platform. Continuing with the example above, the human resources officer may schedule the data visualization to be sent to him by email once a week. If the human resources officer does not renew his IDP account login after a certain period of time (e.g., over a vacation), his IDP credentials may be stale and unable to access the underlying data from the database (206). Instead, the data visualizer may utilize the service account to access the underlying data, generate the data visualization, and send the data visualization to the email server.

Figure 3:
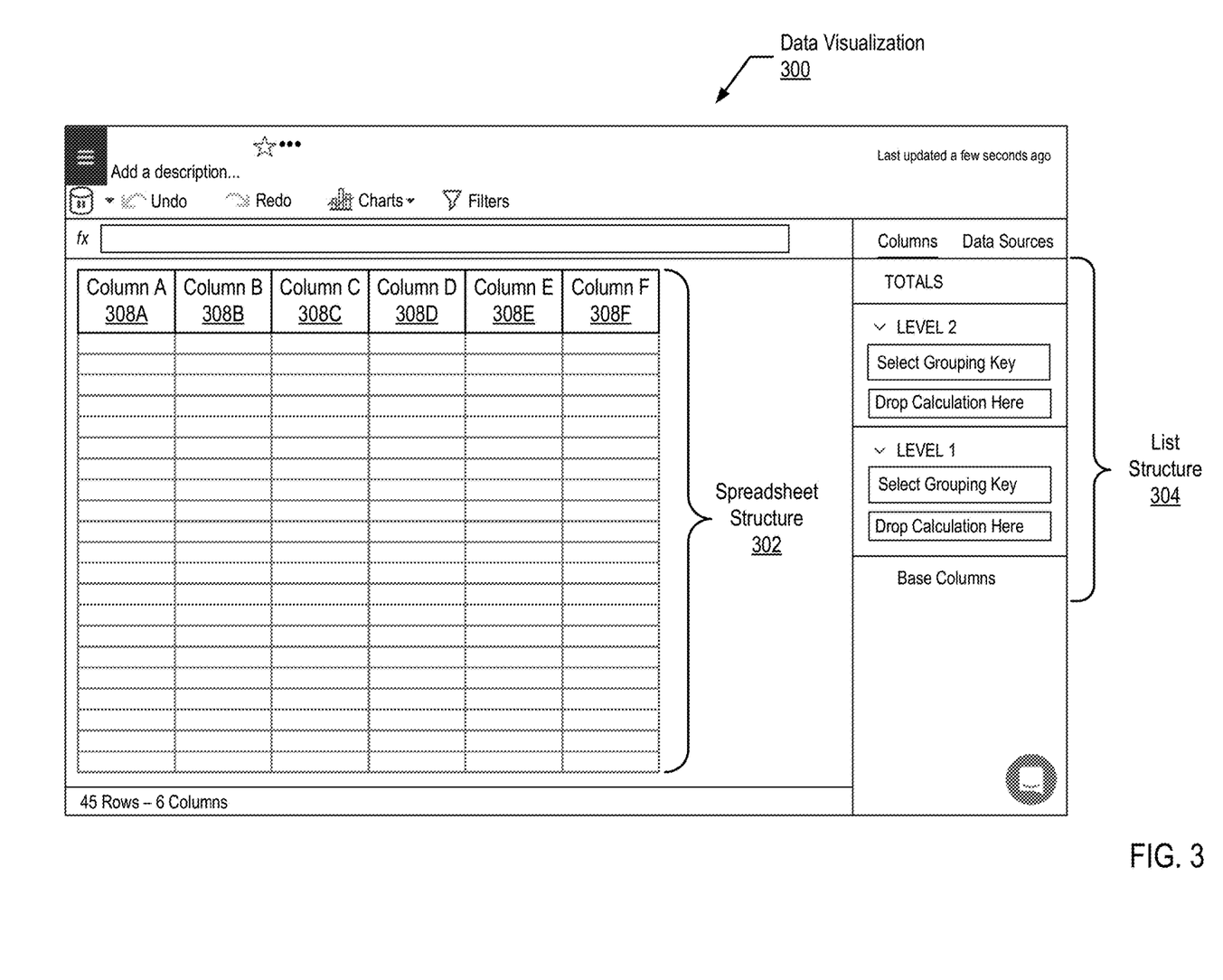
FIG. 3 sets forth a block diagram of an example system configured for supplanting access credentials for shared data visualizations according to embodiments of the present invention.

FIG. 3 shows an exemplary data visualization (300) for supplanting access credentials for shared data visualizations according to embodiments of the present invention. As shown in FIG. 3, the data visualization (300) includes a spreadsheet structure (302) and a list structure (304). The spreadsheet structure (302) includes a worksheet (shown as empty rows) with six columns (column A (306A), column B (306B), column C (306C), column D (306D), column E (306E), column F (306F)).

The spreadsheet structure (302) is a graphical element and organizing mechanism for a worksheet that presents data from a database. A worksheet is a presentation of data from a database (204). The spreadsheet structure (302) displays the worksheet as rows of data organized by columns (column A (306A), column B (306B), column C (306C), column D (306D), column E (306E), column F (306F)). The columns delineate different categories of the data in each row of the worksheet. The columns may also be calculation columns that include calculation results using other columns in the worksheet.

The list structure (304) is a graphical element used to define and organize the hierarchical relationships between the columns (column A (306A), column B (306B), column C (306C), column D (306D), column E (306E), column F (306F)) of data. The term "hierarchical relationship" refers to subordinate and superior groupings of columns. For example, a database may include rows for an address book, and columns for state, county, city, and street. Data from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (304) presents a dimensional hierarchy to the user. Specifically, the list structure (304) presents levels arranged hierarchically across at least one dimension. Each level within the list structure (304) is a position within a hierarchical relationship between columns (column A (306A), column B (306B), column C (306C), column D (306D), column E (306E), column F (306F)). The keys within the list structure (304) identify the one or more columns that are the participants in the hierarchical relationship. Each level may have more than one key.

One of the levels in the list structure (304) may be a base level. Columns selected for the base level provide data at the finest granularity. One of the levels in the list structure (304) may be a totals or root level. Columns selected for the totals level provide data at the highest granular level. For example, the totals level may include a field that calculates the sum of each row within a single column of the entire data set (i.e., not partitioned by any other column).

The data visualization (300) may enable a user to drag and drop columns (column A (306A), column B (306B), column C (306C), column D (306D), column E (306E), column F (306F)) into the list structure (304). The order of the list structure (304) may specify the hierarchy of the columns relative to one another. A user may be able to drag and drop the columns in the list structure (304) at any time to redefine the hierarchical relationship between columns. The hierarchical relationship defined using the columns selected as keys in the list structure (304) may be utilized in charts such that drilling down (e.g., double click on a bar), enables a new chart to be generated based on a level lower in the hierarchy.

The data visualization (300) shown in FIG. 3 is one example of a data visualization. For example, a dashboard data visualization may include other elements (such as a graph) instead of or in addition to the worksheet. Each data visualization may include metadata describing the configuration of elements within the data visualization. Each data visualization may also include a database statement, such as an SQL statement, used to retrieve the underlying data for the data visualization from the cloud-based data warehouse.

Figure 4:
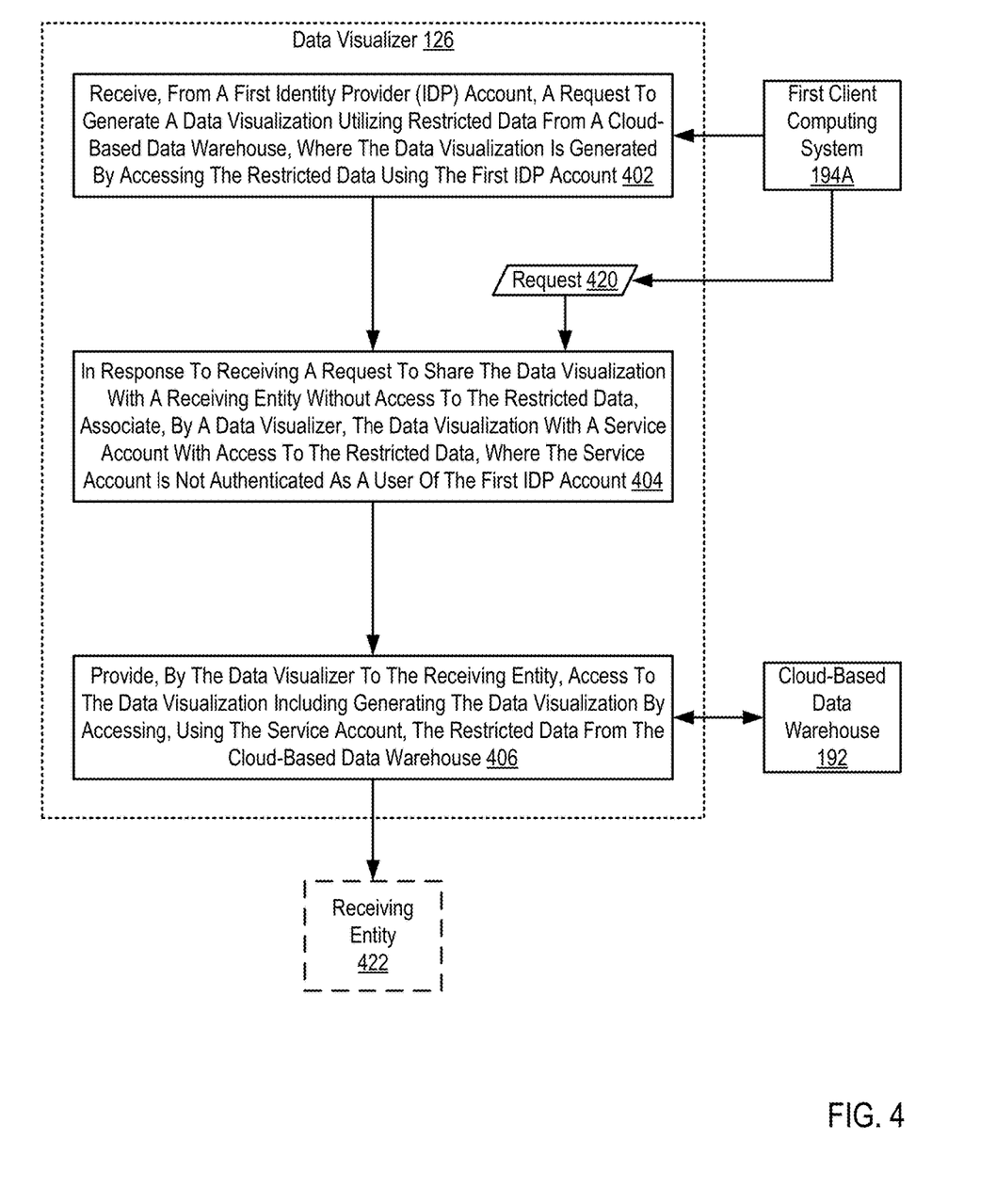
FIG. 4 sets forth a flow chart illustrating an exemplary method for supplanting access credentials for shared data visualizations according to embodiments of the present invention.

For further explanation, FIG. 4 sets forth a flow chart illustrating an exemplary method for supplanting access credentials for shared data visualizations according to embodiments of the present invention that includes receiving (402), from a first identity provider (IDP) account, a request to generate a data visualization utilizing restricted data from a cloud-based data warehouse (192), wherein the data visualization is generated by accessing the restricted data using the first IDP account. Receiving (402), from a first identity provider (IDP) account, a request to generate a data visualization utilizing restricted data from a cloud-based data warehouse (192), wherein the data visualization is generated by accessing the restricted data using the first IDP account may be carried out by the data visualizer (126) receiving instructions and manipulation from the first IDP account on the first client computing system (194A) targeting data from a database presented to the first IDP account user. Restricted data refers to data from the database on the cloud-based data warehouse (192) to which some IDP accounts have access (e.g., the first IDP account) and other IDP accounts do not (e.g, the second IDP account, other receiving entities). The data visualizer (126) may retrieve the restricted data from the cloud-based data warehouse utilizing the credentials of the first IDP account. The data visualizer (126) may then organize and present the restricted data according to the instructions received for the data visualization.

The first IDP account is authorized to access both the cloud-based data warehouse and the data visualizer. Specifically, both the cloud-based data warehouse and the data visualizer use the IDP associated with the first IDP account to authenticate users and associate each user with a set of permissions. Each IDP account, including the first IDP account, is mapped to permissions within both the data visualizer and the cloud-based data warehouse. For the data visualizer, each IDP account may be associated with permissions to access different dashboards, worksheets, schedules, and other data visualizations. For the cloud-based data warehouse, each IDP account may be associated with permissions to access data from different tables or parts of tables within the database. Although the IDP manages the authentication of each IDP account, the specific permissions for each IDP account may be managed by the data visualizer (126) and the cloud-based data warehouse.

The method of FIG. 4 further includes in response to receiving a request (420) to share the data visualization with a receiving entity (422) without access to the restricted data, associating (404), by a data visualizer (126), the data visualization with a service account with access to the restricted data, wherein the service account is not authenticated as a user of the first IDP account. Receiving the request (420) to share the data visualization with the receiving entity (422) without access to the restricted data may be carried out by the data visualizer (126) receiving the request (420) that includes an identifier of the receiving entity (422) and an identifier of the data visualization.

Before associating the service account with the data visualizer (126), the data visualizer may determine whether the identified receiving entity (422) has access to (i.e., has been granted permission to view) the underlying data of the data visualization. For example, the data visualizer (126) may only associate the service account if the data visualizer (126) determines that the receiving entity (422) does not have access to the underlying data. Alternatively, the data visualizer (126) may associate the service account with the data visualization regardless of whether the receiving entity (422) has access to the underlying data.

Associating (404), by a data visualizer (126), the data visualization with a service account with access to the restricted data, wherein the service account is not authenticated as a user of the first IDP account may be carried out by storing, either with the data visualization or with the receiving entity's permission to access the data visualization, an indication that the data visualization is to be generated by accessing the underlying data using the service account instead of the account accessing the data visualization.

The receiving entity (422) may be a second IDP account without access to the restricted data. As with the first IDP account, the service account is not authenticated as a user of the second IDP account. Further, the second IDP account may not have access to the cloud-based data warehouse at all. Alternatively, the receiving entity (422) may be an account exclusively with the data visualizer (126) without an associated IDP account or cloud-based data warehouse account.

The service account is an account with access to the database on the cloud-based data warehouse. The service account essentially overrides an IDP account user's access to the cloud-based data warehouse when viewing a shared data visualization. The service account's access may be broad in that the service account may access a large percentage, or all, of the database. The service account may not be associated, linked, or otherwise connected to any other IDP account or data visualization account. Further, the service account may not be authenticated as any particular user and may be under the control of the data visualizer (126).

The service account may itself be an IDP account. As an IDP account, the service account would access the restricted data on the cloud-based data warehouse (192) using a token provided by the IDP. Alternatively, the service account may be an account directly with the cloud-based data warehouse (192). In that case, the service account would access the restricted data on the cloud-based data warehouse (192) without using a token.

The method of FIG. 4 further includes providing (406), by the data visualizer (126) to the receiving entity (422), access to the data visualization including generating the data visualization by accessing, using the service account, the restricted data from the cloud-based data warehouse (192). Generating the data visualization by accessing, using the service account, the restricted data from the cloud-based data warehouse (192) may be carried out by the data visualizer (126) retrieving metadata for the data visualization, generating or extracting the database statement using the retrieved metadata, and issuing the database statement to the cloud-based data warehouse (192). Once the response including the restricted data is received by the data visualizer (126), the data visualizer (126) incorporates the restricted data into the data visualization, performing any necessary calculations and extrapolations. The shared data visualization may not be manipulatable by the receiving entity. The receiving entity may only have read-only access to the data visualization.

Providing (406), by the data visualizer (126) to the receiving entity (422), access to the data visualization may be carried out by presenting the data visualization within the GUI of a computing system operated by the receiving entity (422). Providing (406), by the data visualizer (126) to the receiving entity (422), access to the data visualization may also be carried out by providing, to the second IDP account, access to the data visualization including presenting the data visualization within the GUI of a computing system operated by the second IDP account user. The second IDP account may only have read-only access to the data visualization.

The steps described above in FIG. 4 as well as those described below in FIG. 5 and FIG. 6 may be performed by the data visualizer (126), by the access manager within the data visualizer, or a combination of the two.

The above limitations improve the operation of the computer system by enabling an IDP account user to share a data visualization with a receiving entity that does not have access to the underlying data. This is accomplished by generating the data visualization using a service account instead of a cloud-based data warehouse account associated with the receiving entity (which may not have access to the underlying data). Further, using the service account instead of an account associated with the user who generated the data visualization ensures independence from the generating account, should that generating account be revoked.

Figure 5:
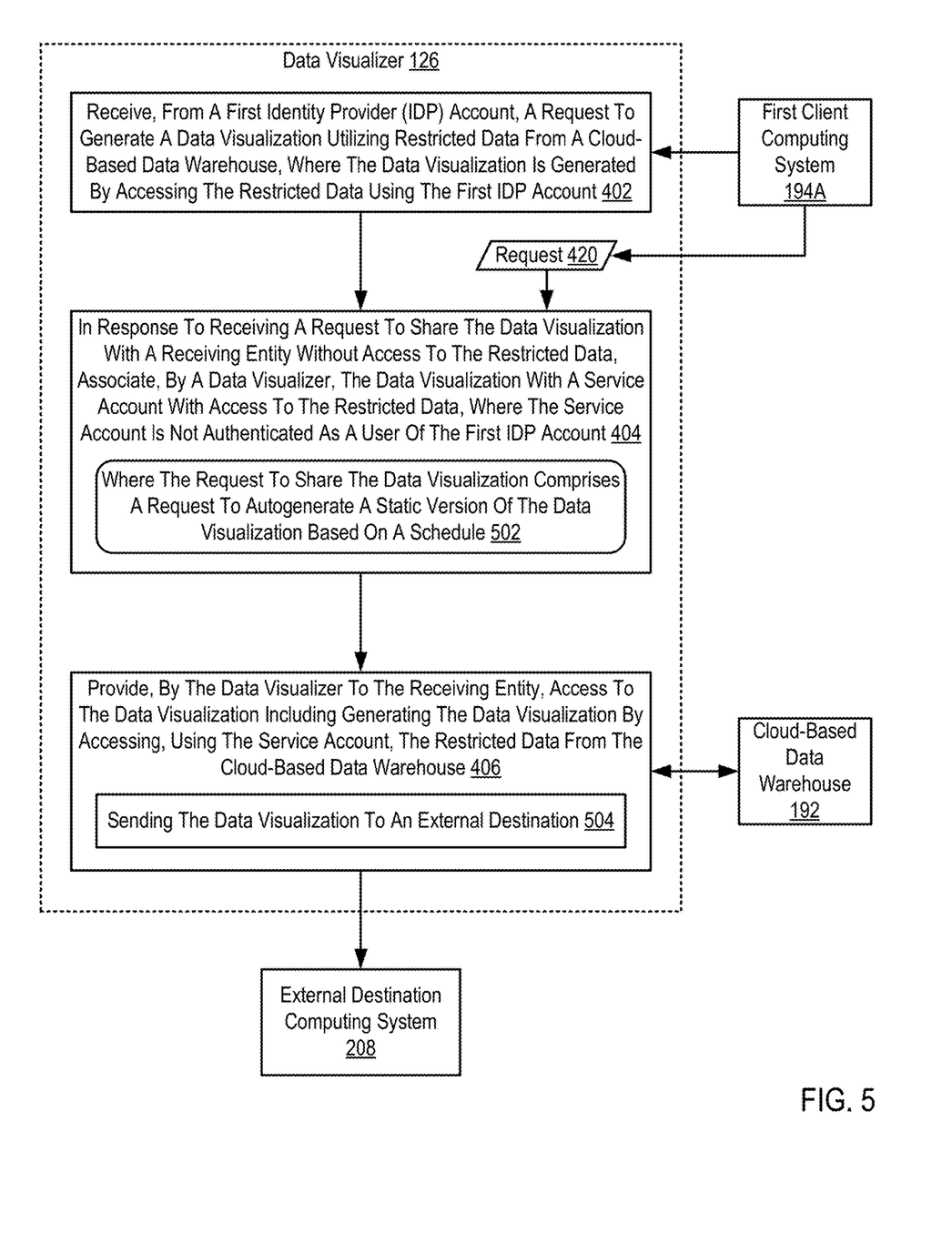
FIG. 5 sets forth a flow chart illustrating an exemplary method for supplanting access credentials for shared data visualizations according to embodiments of the present invention.

For further explanation, FIG. 5 sets forth a flow chart illustrating a further exemplary method for supplanting access credentials for shared data visualizations according to embodiments of the present invention that includes receiving (402), from a first identity provider (IDP) account, a request to generate a data visualization utilizing restricted data from a cloud-based data warehouse (192), wherein the data visualization is generated by accessing the restricted data using the first IDP account; in response to receiving a request (420) to share the data visualization with a receiving entity (422) without access to the restricted data, associating (404), by a data visualizer (126), the data visualization with a service account with access to the restricted data, wherein the service account is not authenticated as a user of the first IDP account; and providing (406), by the data visualizer (126) to the receiving entity (422), access to the data visualization including generating the data visualization by accessing, using the service account, the restricted data from the cloud-based data warehouse (192).

The method of FIG. 5 differs from the method of FIG. 4, however, in that in response to receiving a request (420) to share the data visualization with a receiving entity (422) without access to the restricted data, associating (404), by a data visualizer (126), the data visualization with a service account with access to the restricted data, wherein the service account is not authenticated as a user of the first IDP account includes wherein (502) the request (420) to share the data visualization comprises a request to autogenerate a static version of the data visualization based on a schedule.

A user may want to have the data visualization sent, periodically, to a receiving entity without any access to the data visualizer (126) or cloud-based data warehouse (192). This may be, for example, an email server, a website, or a social media platform. A static version of the data visualization is a version of the data visualization that includes no ability to interact with the data visualization or be updated with new data. A static version of the data visualization may include, for example, and image file or a portable document format file.

The method of FIG. 5 also differs from the method of FIG. 4, in that providing (406), by the data visualizer (126) to the receiving entity (422), access to the data visualization including generating the data visualization by accessing, using the service account, the restricted data from the cloud-based data warehouse (192) includes sending (504) the data visualization to an external destination. Sending (504) the data visualization to an external destination may be carried out by data visualizer (126) interacting with the external destination to transmit the static version of the data visualization. Because the receiving entity has no access to the data visualizer (126), a static version of the data visualization may be generated at the designated times. For example, a data visualization showing a graph of each month's sales may be sent, as a static image email attachment, each month to a regional sales manager.

Figure 6:
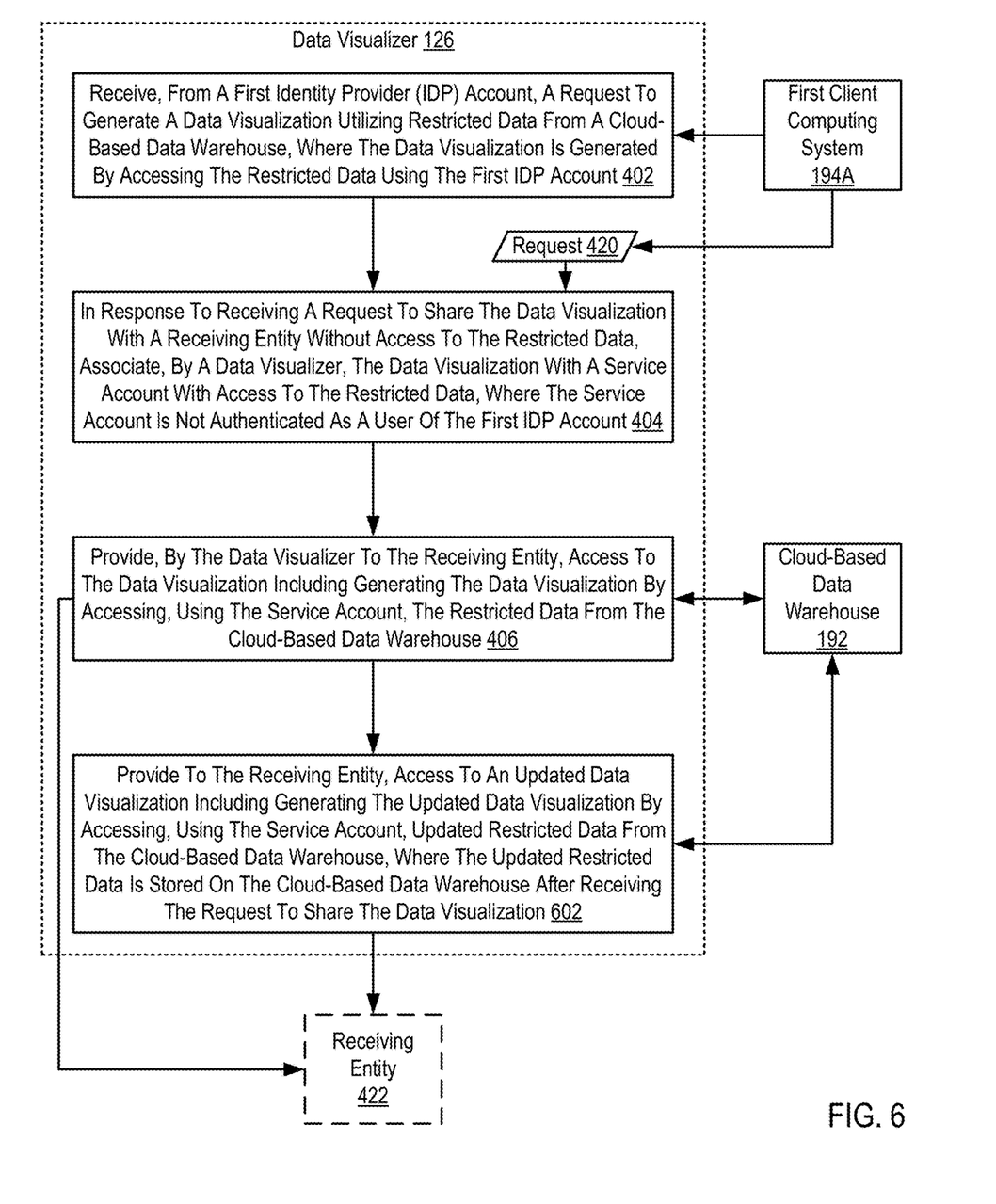
FIG. 6 sets forth a flow chart illustrating an exemplary method for supplanting access credentials for shared data visualizations according to embodiments of the present invention.

For further explanation, FIG. 6 sets forth a flow chart illustrating a further exemplary method for supplanting access credentials for shared data visualizations according to embodiments of the present invention that includes receiving (402), from a first identity provider (IDP) account, a request to generate a data visualization utilizing restricted data from a cloud-based data warehouse (192), wherein the data visualization is generated by accessing the restricted data using the first IDP account; in response to receiving a request (420) to share the data visualization with a receiving entity (422) without access to the restricted data, associating (404), by a data visualizer (126), the data visualization with a service account with access to the restricted data, wherein the service account is not authenticated as a user of the first IDP account; and providing (406), by the data visualizer (126) to the receiving entity (422), access to the data visualization including generating the data visualization by accessing, using the service account, the restricted data from the cloud-based data warehouse (192).

The method of FIG. 6 differs from the method of FIG. 4, however, in that the method of FIG. 6 further includes providing (602) to the receiving entity (422), access to an updated data visualization including generating the updated data visualization by accessing, using the service account, updated restricted data from the cloud-based data warehouse (192), wherein the updated restricted data is stored on the cloud-based data warehouse (192) after receiving the request to share the data visualization. In contrast to a shared static document (such as an excel file), the data visualization is updated with updated restricted data from the cloud-based data warehouse (192) each time the data visualization is generated for the receiving entity (422). This requires no action by the IDP account that generated the data visualization, nor does it require that the IDP account that generated the visualization still be authorized to access the underlying data because the underlying data is retrieved using the service account.

In view of the explanations set forth above, readers will recognize that the benefits of supplanting access credentials for shared data visualizations according to embodiments of the present invention include:
  Improving the operation of a computing system by enabling an IDP account user to share a data visualization with a receiving entity that does not have access to the underlying data, increasing computing system efficiency and usability.
  Improving the operation of a computing system by ensuring independence from the generating account by using the service account instead of an account associated with the user who generated the data visualization, should that generating account be revoked, increasing computing system efficiency and usability.

Exemplary embodiments of the present invention are described largely in the context of a fully functional computer system for supplanting access credentials for shared data visualizations. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of supplanting access credentials for shared data visualizations, the method comprising:
receiving, from a first identity provider (IDP) account, a request to generate a data visualization utilizing restricted data from a cloud-based data warehouse, wherein the data visualization is generated by accessing the restricted data using the first IDP account;
in response to receiving a request to share the data visualization with a receiving entity without access to the restricted data, associating, by a data visualizer, the data visualization with a service account with access to the restricted data, wherein the service account is not authenticated as a user of the first IDP account;
providing, by the data visualizer to the receiving entity, access to the data visualization including generating the data visualization by accessing, using the service account, the restricted data from the cloud-based data warehouse; and
wherein the receiving entity is a second IDP account without access to the restricted data, wherein the service account is not authenticated as a user of the second IDP account, and wherein providing, to the receiving entity, access to the data visualization comprises providing, to the second IDP account, access to the data visualization.

2. The method of claim 1, wherein the second IDP account has read-only access to the data visualization.

3. The method of claim 1, wherein the request to share the data visualization comprises a request to autogenerate a static version of the data visualization based on a schedule, and wherein providing, to the receiving entity, access to the data visualization comprises sending the data visualization to an external destination.

4. The method of claim 1, further comprising providing to the receiving entity, access to an updated data visualization including generating the updated data visualization by accessing, using the service account, updated restricted data from the cloud-based data warehouse, wherein the updated restricted data is stored on the cloud-based data warehouse after receiving the request to share the data visualization.

5. The method of claim 1, wherein the first IDP account is authorized to access the cloud-based data warehouse and the data visualizer, and wherein the first IDP account is mapped to permissions within the data visualizer.

6. The method of claim 1, wherein the service account accesses the restricted data on the cloud-based data warehouse using a token.

7. The method of claim 1, wherein the service account accesses the restricted data on the cloud-based data warehouse without using a token.

8. The method of claim 1, wherein the data visualization is an abstraction of a worksheet comprising the restricted data from the cloud-based data warehouse.

9. The method of claim 1, wherein the service account is under the control of the data visualizer and is not authenticated for any particular user.

10. An apparatus for supplanting access credentials for shared data visualizations, the apparatus comprising a computer processor, a computer memory operatively coupled to the computer processor, the computer memory having disposed within it computer program instructions that, when executed by the computer processor, cause the apparatus to carry out the steps of:
    receiving, from a first identity provider (IDP) account, a request to generate a data visualization utilizing restricted data from a cloud-based data warehouse, wherein the data visualization is generated by accessing the restricted data using the first IDP account;
    in response to receiving a request to share the data visualization with a receiving entity without access to the restricted data, associating, by a data visualizer, the data visualization with a service account with access to the restricted data, wherein the service account is not authenticated as a user of the first IDP account;
    providing, by the data visualizer to the receiving entity, access to the data visualization including generating the data visualization by accessing, using the service account, the restricted data from the cloud-based data warehouse; and
    wherein the receiving entity is a second IDP account without access to the restricted data, wherein the service account is not authenticated as a user of the second IDP account, and wherein providing, to the receiving entity, access to the data visualization comprises providing, to the second IDP account, access to the data visualization.

11. The apparatus of claim 10, wherein the second IDP account has read-only access to the data visualization.

12. The apparatus of claim 10, wherein the request to share the data visualization comprises a request to autogenerate a static version of the data visualization based on a schedule, and wherein providing, to the receiving entity, access to the data visualization comprises sending the data visualization to an external destination.

13. The apparatus of claim 10, wherein the computer program instructions further cause the apparatus to carry out the step of providing to the receiving entity, access to an updated data visualization including generating the updated data visualization by accessing, using the service account, updated restricted data from the cloud-based data warehouse, wherein the updated restricted data is stored on the cloud-based data warehouse after receiving the request to share the data visualization.

14. The apparatus of claim 10, wherein the first IDP account is authorized to access the cloud-based data warehouse and the data visualizer, and wherein the first IDP account is mapped to permissions within the data visualizer.

15. The apparatus of claim 10, wherein the service account accesses the restricted data on the cloud-based data warehouse using a token.

16. The apparatus of claim 10, wherein the service account accesses the restricted data on the cloud-based data warehouse without using a token.

17. The apparatus of claim 10, wherein the data visualization is an abstraction of a worksheet comprising the restricted data from the cloud-based data warehouse.

18. A computer program product for supplanting access credentials for shared data visualizations, the computer program product disposed upon a non-transitory computer readable medium, the computer program product comprising computer program instructions that, when executed, cause a computer to carry out the steps of:
    receiving, from a first identity provider (IDP) account, a request to generate a data visualization utilizing restricted data from a cloud-based data warehouse, wherein the data visualization is generated by accessing the restricted data using the first IDP account;
    in response to receiving a request to share the data visualization with a receiving entity without access to the restricted data, associating, by a data visualizer, the data visualization with a service account with access to the restricted data, wherein the service account is not authenticated as a user of the first IDP account;
    providing, by the data visualizer to the receiving entity, access to the data visualization including generating the data visualization by accessing, using the service account, the restricted data from the cloud-based data warehouse; and
    wherein the receiving entity is a second IDP account without access to the restricted data, wherein the service account is not authenticated as a user of the second IDP account, and wherein providing, to the receiving entity, access to the data visualization comprises providing, to the second IDP account, access to the data visualization.

* * * * *